United States Patent Office 3,326,702
Patented June 20, 1967

3,326,702
COLORED GLASSES AND PROCESS OF MANUFACTURE
Clarence L. Babcock, Toledo, Ohio, assignor to Owens-Illinois, Inc., a corporation of Ohio
No Drawing. Filed July 29, 1965, Ser. No. 475,863
8 Claims. (Cl. 106—52)

This application is a continuation-in-part of copending application Ser. No. 124,011 filed July 14, 1961 and now abandoned.

This invention relates to the production of colored glasses.

More particularly this invention relates to the production of colored glasses by the forehearth addition of colorants to color-compatible molten base glasses.

Further, this invention relates to colorant-enriched frit glasses for use in making colored composite glasses.

Still more particularly this invention relates to the manufacture of glasses of enhanced depth and intensity of color, by the addition to a molten, color-receptive, compatible base glass of a colorant-rich material that is compatible with the base glass.

*The problem*

The manufacture of colored glass by the addition of a colorant-enriched frit glass to a molten colorless base glass flowing through a forehearth from a melting tank has been previously proposed. Utilization of this process makes possible the manufacture of both colored glass items and colorless glass items from a single melting tank or furnace having multiple forehearths.

In the forehearth coloration process a frit glass is metered into the molten base glass where the base glass flows from the fining zone of the melter into the forehearth. This is done by a suitable vibratory feeder. Also, water cooled stirrers are used to admix the colorant frit glass into the base glass and produce uniformly homogenized color all through the composite glass so formed so that ware of uniform color throughout will be produced.

However, in the past considerable problems have been encountered when attempts have been made to introduce high concentration colorant glasses into the colorless base glass in the forehearth. The decolorizers used in the base glass, in order to keep it clear and colorless, are often incompatible with the colorant glass added into the forehearth. Thus, it has been found that the decolorizers often have a detrimental effect on the brightness of color of the composite glass produced.

Further, the incompatibility between the base glass and the added colorant often produces off-gases, particularly if the added colorant contains a reducing agent. These off-gases remain in the glass as tiny bubbles which are called seeds or blisters in the finished ware, and cause rejects. Generally, the melting and fining zones of glass melting furnaces are maintained at substantially higher temperatures than the forehearth. Thus, melting and fining temperatures in the range 2750–3000° F. are common. These temperatures cause the glass viscosity to be reduced and the tiny bubbles of gas to be driven out of the molten glass.

However, temperatures in the forehearth must be reduced substantially so that the glass will have a sufficiently high viscosity to form properly. If the glass is too hot, the viscosity will be too low to form. Therefore, forehearth temperatures are generally in the range of 2350° F. down to about 1950° F. These temperatures are too low to fine the glass and remove the seeds.

Also, the frit glasses heretofore used often have had such high softening and liquidus temperatures as compared to the base glass that they did not melt readily and did not mix thoroughly into the base glass at forehearth temperatures. In fact, in some chromium-colored composite glasses, actual crystals of chromium oxide have been found in the final ware due to the improper admixing and melting of the high chromium frit glass with the base glass. Therefore, a further problem of incompatibility exists.

ADVANCE TO THE ART

In accordance with the present invention, a compatible colorant is added to a compatible molten base glass in the forehearth. Particularly by the present invention, the base glasses include amber glasses to which compatible frit glasses and other colorants are added. The colorants uniquely enhance the intensity and depth of color of the base glasses and by the principles involved, many shades and varying hues of amber can be produced. Within the scope of the invention it is possible to obtain composite amber glasses of substantially greater depth of color and, if desired, enhanced opacity to rays that are harmful to foodstuff. These include ultraviolet rays which are detrimental to many types of fruit juices and malt beverages.

The compatibility principle of the present invention thus particularly provides a substantial advance to the art of amber glass manufacture. Amber, as is well known, has a very low transmissivity for infrared rays which are commonly used to heat the batch materials and produce the molten base glass in the melter. Thus, infrared rays are produced by the intense heat of combustion of a fuel whose flames are directed across the melting chamber. Since amber does not transmit infrared, the heat of combustion is prevented from penetrating deeply into the body of the melt. Therefore, the melting of deeply colored ambers is very uneconomical and often substantially impossible.

However, by the present invention, the base glass is very lightly colored—just enough to render it compatible with the subsequently added colorant. By so operating, the melting and fining of the base glass are enhanced because of the high infrared absorption. Then, in the forehearth, the intensity of color is produced to the degree desired without ill effect on the melting and fining operation.

Accordingly, it is an important object to provide a novel process of making colored glass by the addition of a compatible colorant to a compatible base glass.

A further object is to provide a process of making colored glass by the addition to a molten colored base glass, of a compatible colorant-enriched frit glass.

Another important object is to provide composite amber glasses of enhanced depth of color and intensity and of increased opacity to harmful light rays, and containing a color complex of iron and sulfur.

Further, it is an object to provide colorant-enriched frit glasses for addition to colored molten base glasses, which frit glasses contain colorant materials in concentrations substantially greater than the concentrations of colorant in the molten base glasses.

It is a further object to provide highly colorant-enriched frit glass batches which contain iron and sulfur and an amount of reducing agent sufficient to retain the iron predominantly in the ferrous state and the sulfur predominantly in the sulfide state.

A further object is to provide heretofore unobtainable amber glasses by adding to a molten base amber glass a chromophore-enriched colorant composition.

*Introduction to the invention*

The various aspects of this invention are as follows:
(1) Melting a partially colored glass in a melting furnace and adding a compatible colorant to the glass in the forehearth of the furnace. The colorant can include a frit glass and/or a powdered color-forming chemical compound. A particularly useful application of this aspect of the invention involves the use of an amber base glass for the production of enhanced amber colors by the forehearth addition of compatible frit glasses of high colorant concentration.

(2) Melting a glass having color potentials therein and simultaneously converting these to color in the forehearth while adding a colorant frit glass.

(3) A further aspect is the novel composite amber glasses produced.

*Base glasses*

The present invention comprehends the initial formation of a molten partially colored base glass. This is suitably produced in a large, continuously operated melting tank from a glass batch including a major amount of glass-forming constituents and a minor amount of color-forming constituents. After the base glass is melted and refined at elevated temperatures, it is channeled through one or more forehearths to forming locations at which the glass is introduced into forming machines for the manufacture of containers or other ware. During the passage through the forehearth, the temperature of the glass drops from the higher refining level down to the forming level where temperature and viscosity are proper for forming ware.

Exemplary of partially colored and compatible base glasses are amber container glasses which are manufactured from a batch containing iron and sulfur in the form of ferric oxide and sulfate sulfur. The batches for these glasses usually contain sea coal or powdered carbon as a reducing agent for the iron and sulfur. This converts the iron to the ferrous state and the sulfur to the sulfide state. These two substances combine into a "color complex or chromophore" in the molten glass. This color complex absorbs rays in the ultraviolet region and also gives the glass its distinctly amber color in the visible region.

The presence of the reducing agent insures existence of the iron and sulfur in the lower valence states to form the chromophore. The utilization of sea coal or similar form of carbon as a reducing agent is advantageous since it completely burns off at the temperatures of the molten glass and therefore does not exert any colorant influence on the composite glasses. Other reducing agents that can be utilized include elemental metals such as silicon, aluminum and zinc; although these are more expensive.

Table I sets forth base amber glasses adapted to use in the present invention. These compositions are based upon theoretical oxides analyses. The reducing agent does not appear since it is burned off during the melting and fining of the glass. When using sea coal as the reducing agent, about 5 lbs. per ton of sand is admixed with the batch. The iron content is expressed as $Fe_2O_3$ even though it is present predominantly in the ferrous, FeO, state. This expression of the iron content is in accordance with conventional compositional analysis reporting practices of the industry.

TABLE I.—BASE AMBER GLASSES

[Theoretical analyses based on batch]

| Oxide: | Percent by weight |
|---|---|
| $SiO_2$ | 60–75 |
| $Al_2O_3$ | .3–10 |
| CaO+MgO | 6–15 |
| $Na_2O$ | 12–18 |
| $K_2O$ | 0–5 |
| BaO | 0–5 |
| $Fe_2O_3$ | .05–.10 |
| S | .05–.10 |

In Table II a typical base amber glass A is set forth in terms of actual oxide analysis of the final glass. Carbon, the reducing agent, is omitted for reasons previously given.

TABLE II.—TYPICAL BASE AMBER GLASS A

[Actual oxide analysis]

| Oxide: | Percent by weight |
|---|---|
| $SiO_2$ | 71.6 |
| $Al_2O_3$ | 2.0 |
| CaO | 11.25 |
| MgO | .15 |
| $Na_2O$ | 14.50 |
| $K_2O$ | .25 |
| $Fe_2O_3$ | .09 |
| S | .09 |

Transmittance at 500 mu, ⅛" thickness: 30%.

The conditions and procedures for making glasses of the order of glass A are known to the art; see Table XX, B–11, page 345 of "Handbook of Glass Manufacture," by Tooley, Ogden Publishing Company, New York, N.Y., 1953.

In accordance with the broad principles of the present invention, the frit glasses can be added to a broad range of reduced glasses. Accordingly, the exemplary amber glasses described are not to be considered limiting on the invention. They are suggested as applicable for commercial container production.

Specifically, glass A is preferably formed in a melting furnace at a temperature on the order of 2750° F. The glass enters the forehearth of the furnace at a temperature in the range of about 2500–2600° F. Within the forehearth, the temperature of the molten glass decreases in order to reduce the viscosity to proper forming levels to a forehearth outlet temperature of about 2350–1900° F.

It is at this point in the process that the prior art practitioners have encountered substantial difficulties. Thus, serious mixing problems have been encountered at the lower forehearth temperatures. In the past the colorant frit glasses often have had such high softening and liquidus temperatures that they either did not melt readily or would not mix thoroughly with the base glass at the forehearth temperatures.

By the present invention, highly compatible frit colorant glasses and compatible base glasses are utilized wherein the colorant material is present in each. By the present invention the colorant level in the base glass is low or at a "threshold level." It is thereby rendered "receptive" or ready for the frit colorant. Thus, the base glass is conditioned to receive the colorant of the frit glass.

*The colorant frit glasses of invention*

In accordance with the principles of this invention, frit glasses highly compatible with the base glasses described above have been found to fall within the compositional ranges set forth in Table III.

TABLE III.—COLORANT FRIT GLASS COMPOSITIONS

[Theoretical oxide analyses based on batch]

| Oxide: | Percent by weight |
|---|---|
| $SiO_2$ | 55–70 |
| CaO | 5–10 |
| $Na_2O$ | 10–20 |
| $Fe_2O_3$ | 3–20 |
| S | .05–1 |

Table IV contains actual oxide analyses of three colorant frit glasses prepared within the limits of Table III.

TABLE IV

| Oxide | Percent by Weight | | |
|---|---|---|---|
| | "B" | "C" | "D" |
| $SiO_2$ | 58.86 | 67.41 | 65.70 |
| CaO | 8.48 | 9.63 | 9.33 |
| $Na_2O$ | 16.97 | 19.30 | 18.67 |
| $Fe_2O_3$ | 15.61 | 3.09 | 5.67 |
| S | .08 | .57 | .63 |

From the foregoing, it will be observed that the colorant frit glass compositions of this invention are highly enriched, particularly in iron. This enrichment is made at the expense of the glass-forming ingredients. Since relatively small proportions, based on the composite glass, are incorporated into the molten base glass, it has been found that it is not necessary that the frits per se, possess all of the characteristics of the composite glass in order to be compatible with the base glass.

In addition to chromophore-forming ingredients including iron and sulfur, the frit batch compositions containing a suitable amount of reducing agent to maintain the chromophore-forming ingredients in the reduced state where coloration is most intense. Reducing agents can include sea coal, and metals including silicon, aluminum and zinc. By maintaining the proportion of reducing agent at a suitably high level, intense coloration of the frit glasses is provided.

In the frit glass batch compositions, the proportion of reducing agent is substantially higher than that in the base glass batch. For example, the batch for a base glass would contain about five pounds of sea coal per ton of silica. In the frit batch, from about 5 to about 15 pounds of sea coal per ton of sand would be used. This amounts to about 0.15 to about 0.5 percent by weight of the total frit batch. Sea coal is preferred because of the advantageous cost factor.

Table IV-A shows the amounts of various reducing agents that are used to reduce a major amount of the iron to the ferrous, FeO, state and to reduce a major amount of the sulfur to the sulfide (S) state.

TABLE IV-A

| Frit Batch Ingredients | Reducing Agent for 75% Reduction | | | |
|---|---|---|---|---|
| | Percent Si | Percent Al | Percent Zn | Percent C |
| Percent Fe$_2$O$_3$: | | | | |
| 16.0 | 10.55 | 1.35 | 4.91 | .431 |
| 6.0 | .396 | .506 | 1.84 | .170 |
| 3.0 | .198 | .253 | .921 | .085 |
| 1.0 | .066 | .084 | .307 | .028 |
| Percent S: | | | | |
| .6 | .195 | .252 | .916 | .094 |
| .1 | .0326 | .042 | .153 | .014 |

As an illustration, a frit batch containing 6% Fe$_2$O$_3$ and .6% S would require 0.396 plus 0.195 or a total of 0.591% of silicon to reduce 75% of the chromophore producing materials.

Exact amounts of reducing agents required will depend somewhat upon specific melting conditions such as temperature, furnace design and the like.

The frit glass is prepared by melting the frit batch in a separate melter under reducing, fining conditions. Temperatures within the range of 2700–2800° F. have been found satisfactory.

The melted frit glass is suitably poured from the melter and chilled rapidly, as by running it into water. This causes the frit glass to break up into granular form suitable for feeding into the forehearth for coloring the base glass. The frit glass is dried before adding to the base glass.

By maintaining the atmosphere of the frit glass furnace on the reducing side, along with the use of the reducing agent the iron and sulfur contents are retained generally about 85% in the reduced state. This is done by reducing the amount of oxygen to less than that necessary to effect complete combustion of the fuel gas. If desired, this reducing atmosphere can be implemented by the introduction of reducing gases such as hydrogen, carbon monoxide, methane and others.

Insufficient oxygen being available for oxidation, the frit glass is maintained in the reduced state. Under these conditions the iron and sulfur unit to form the chromophore which imparts the deep color intensity to the finished frit glass.

In the extended scope of the invention, colorants other than frit glasses also can be added into the forehearth. Iron sulfide in powder form would be included for the production of enhanced amber glasses. Optionally when so operating, a high-temperature sensitive wetting agent can be used in minor amount to cause the iron sulfide powder to fuse rapidly into the molten base glass. Materials which can be used for this purpose include sodium silicate, sodium borate and sodium phosphate all in powder form. These can be admixed with the iron sulfide colorant for the addition. An amount of solubilizer based on the amount of iron sulfide powder in the range from about .001 to about .2% by weight provides a highly useful additive composition.

Losses by volatilization are very slight by operating in accordance with the present invention. Therefore the amount of solubilizer has little if any effect on the final glass composition or its properties.

It has been found that physically occluded gases in the powdered additives are driven off by the temperatures existent in the forehearth as the additive is laid on the surface of the molten glass.

As an extension of this aspect of the invention, an alkali metal monoxide can be added in minor amounts to facilitate the wetting of the powdered colorant. Sodium monoxide is one monoxide of this type.

*Production of composite glasses*

By the present invention the highly colored frit glass can be added to the molten base glass in the forehearth as a finely-divided solid by distributing it uniformly over the surface of the molten base glass. This will cause the frit glass to fuse. Then, by stirring and mixing the molten base glass and the fused frit glass together, uniform and homogeneous color will be produced throughout the composite glass so formed. If desired, the colorant frit glass can be melted and added to the molten glass in liquid form.

The stirring means and mixing baffles of the prior art can be used to produce homogeneous admixture of the compatible colorant frit glass into the compatible molten base glass to produce uniformly colored composite glass ware.

By the present invention it has been found that unexpectedly good color uniformity is provided because of the fact that the base glass and the frit glass are compatible with one another even though the frit is extremely highly colored. Further, the fact that the two glass compositions are compatible results in unexpectedly high rates of admixture of the two glasses and seeds and blisters in the final ware have been found to be reduced to a very low level.

The amount of frit glass to be combined into the composite glass will be determined by the intensity of color of the frit glass and the color intensity desired in the composite glass. By the present invention it is possible to produce composite glasses having colorant concentration in the range from at least about .2 to about 1% by weight of the composite glass.

By the present invention, it has been found that the depth and intensity of color, particularly of amber glasses, increases with the amount of ferrous iron and/or sulfide sulfur incorporated into the composite glass. Additionally, the transmissivity for ultraviolet rays, and in fact, light of all wave lengths is decreased as the presence of the chromophore formed by the ferrous iron and the sulfide sulfur increases.

Also, the transmissivity of light decreases as the chemically reduced state of the glass is increased, as by a more strongly reducing gaseous atmosphere above the glass.

The presence of the chromophore of ferrous iron and sulfide sulfur substantially reduces transmission of radiation of all wave lengths, including infra-red radiation. As has been mentioned above, this has a very detrimental effect on the heat transfer during the melting operation.

Thus, by the present invention it is now possible to form amber glasses of color intensity that was previously considered uneconomical.

The present invention therefore makes possible the practical production of novel amber glasses of enhanced color depth and intensity and of increased opacity by the combination of a compatible colorant frit glass with a compatible base glass previously conditioned with a threshhold amount of the same colorant as contained in the frit glass.

An exemplary composite glass that was made by the present invention is shown in Table IV. This was produced by adding only 40 pounds of the frit glass B, Table IV, per ton to the base amber glass A of Table II.

TABLE V.—COMPOSITE GLASS E

[Actual oxide analysis]

| Oxide: | Percent by weight |
|---|---|
| $SiO_2$ | 71.339 |
| $Al_2O_3$ | 2.00 |
| CaO | 11.25 |
| MgO | .15 |
| $Na_2O$ | 14.50 |
| $K_2O$ | .25 |
| $Fe_2O_3$ | .406 |
| S | .105 |

Transmittance at 500 mu, 1/8″ thickness: 12%

A second composite glass made by the present invention is shown in Table VI. This was produced by adding 50 lbs. of frit glass B of Table IV per ton to the base amber glass A of Table II.

TABLE VI.—COMPOSITE GLASS F

[Actual oxide analysis]

| Oxide: | Percent by weight |
|---|---|
| $SiO_2$ | 71.261 |
| $Al_2O_3$ | 2.00 |
| CaO | 11.25 |
| MgO | .15 |
| $Na_2O$ | 14.50 |
| $K_2O$ | .25 |
| $Fe_2O_3$ | .480 |
| S | .109 |

Transmittance at 500 mu, 1/8″ thickness: 7%

A third composite glass made by the present invention is shown in Table VII. This was produced by adding 50 lbs. of frit glass C, Table IV, per ton to the base amber glass A of Table II.

TABLE VII.—COMPOSITE GLASS G

[Actual oxide analysis]

| Oxide: | Percent by weight |
|---|---|
| $SiO_2$ | 71.56 |
| $Al_2O_3$ | 2.00 |
| CaO | 11.25 |
| MgO | .15 |
| $Na_2O$ | 14.50 |
| $K_2O$ | .25 |
| $Fe_2O_3$ | .170 |
| S | .104 |

Transmittance at 500 mu, 1/8″ thickness: 24%.

A fourth composite glass made by the present invention as shown in Table VIII. This was produced by adding 50 lbs. of frit glass D, Table IV, per ton to the base amber glass A of Table II.

TABLE VIII.—COMPOSITE GLASS H

[Actual oxide analysis]

| Oxide: | Percent by weight |
|---|---|
| $SiO_2$ | 71.511 |
| $Al_2O_3$ | 2.00 |
| CaO | 11.25 |
| MgO | .15 |
| $Na_2O$ | 14.50 |
| $K_2O$ | .25 |
| $Fe_2O_3$ | .234 |
| S | .105 |

Transmittance at 500 mu, 1/8″ thickness: 20%.

From the foregoing and the following it will be evident that the admixture of the colorant enriched frit glasses with the compatible colored base glasses results in composite colored glasses containing increased amounts of colorant and possessing characteristics of enhanced light opacity.

Additional composite glasses which can be prepared within the scope of the invention are set forth in Table IX. Transmissions for the composite glasses are also set forth in Table IX.

TABLE IX.—COMPOSITE GLASSES

[Colorant analysis only]

| Sample No. | Colorants (percent by weight) | | Percent transmittance | | | |
|---|---|---|---|---|---|---|
| | $Fe_2O_3$ | S | 350 mu | 450 mu | 550 mu | 650 mu |
| I (Control) | 0.10 | 0.10 | 1.6 | 1.1 | 38.0 | 64.9 |
| J | 0.20 | 0.10 | 0.1 | 0.0 | 19.0 | 41.5 |
| K | 0.25 | 0.10 | 0.0 | 0.0 | 15.3 | 36.9 |
| L | 0.30 | 0.10 | 0.0 | 0.0 | 9.7 | 26.0 |
| M | 0.05 | 0.20 | 1.7 | 1.3 | 37.5 | 67.7 |
| N | 0.05 | 0.23 | 1.2 | 1.1 | 35.0 | 64.8 |
| O | 0.05 | 0.30 | 0.4 | 0.0 | 25.0 | 59.0 |
| P | 0.05 | 0.50 | 0.0 | 0.0 | 10.2 | 31.5 |
| Q | 0.05 | 0.70 | 0.0 | 0.0 | 8.8 | 19.3 |
| R | 0.20 | 0.05 | 0.3 | 0.2 | 28.5 | 52.2 |
| S | 0.20 | 0.10 | 0.1 | 0.0 | 19.0 | 41.5 |
| T | 0.20 | 0.15 | 0.0 | 0.0 | 11.7 | 30.8 |
| U | 0.20 | 0.20 | 0.0 | 0.0 | 7.4 | 21.3 |
| V | 0.20 | 0.25 | 0.0 | 0.0 | 6.3 | 15.0 |

Glasses I through L illustrate the increase in opacity upon the addition of increasing amounts of ferrous iron to glasses containing a constant amount of sulfur.

Glasses M through Q illustrate the increase in opacity of glasses containing a relatively small amount (.05% by weight) of ferrous iron upon the addition of increased amounts of sulfur.

Glasses R through V are similar to glasses M through Q with the exception that greater amounts of iron are present.

In Table X there are set forth the ranges of oxide ingredients in composite colored glasses of the present invention possessing the characteristics hereinbefore set forth.

TABLE X.—COMPOSITE GLASSES

[Theoretical analysis]

| Oxide: | Percent by weight |
|---|---|
| $SiO_2$ | 60–75 |
| $Al_2O_3$ | .3–10 |
| CaO+MgO | 6–15 |
| $Na_2O$ | 12–18 |
| $K_2O$ | 0–5 |
| BaO | 0–5 |
| $Fe_2O_3$ | .05–.30 |
| S | .05–.70 |
| $Fe_2O_3$+S | .2–1.0 |

*Extended scope of invention*

In the foregoing description it has been pointed out that the base glass has a threshold amount of colorant contained in it. Thus, it is conditioned in order to be compatible with the added colorant frit glass. Within the extended scope of invention, the colorant can be present in latent form, as distinguished from actual chromophore form discussed previously.

In this aspect of the invention the base glass can be made under oxidizing conditions in the melter. When so made, the iron will be present as ferric oxide and the sulfur in sulphite form. In these states these materials are colorless. However, they are present in a latent state that can be converted to produce an amber chromophore. This can be done in the forehearth of the furnace. Simultaneously with this conversion a compatible colorant also can be added. When producing enhanced amber colored composite glasses, the forehearth additives will include iron and sulfur, in accordance with the principles of the invention. These therefore are completely compatible with the base glass because the chromophore in the colorant frit glass is the same as that developed in the base glass by the reducing conditions, namely the conversion of ferric iron to ferrous iron and sulphate sulfur into sulfide sulfur.

By this aspect of the invention therefore the oxidized glass is reduced to amber and simultaneously, the additive colorant frit glass further enhances the amber color to a very high level previously considered uneconomically feasible for commercial operation in the melter.

By operating in accordance with this aspect of the invention, melter efficiency is even further enhanced. Here, since the iron and sulfur are present in the colorless state in the base glass, radiant heat transfer into the melt is as high as possible and thus so is the melting efficiency.

This embodiment of the invention also provides substantial advancement over the prior art wherein color development depended upon the introduction of reducing agents into the forehearth. The reducing agents caused the oxides and oxide complexes in the molten glass to break down and release oxygen, carbon dioxide and the like. These became trapped to form seeds and blisters.

The present invention unexpectedly accomplishes enhanced amber production by affecting the reduction at the surface of the molten glass so that any gases produced are readily released. By stirring, the lower part of the molten gas is brought to the surface for the reducing treatment. Accordingly improved glasses are produced.

When operating in accordance with this extension of the invention, the atmosphere of the melter and the forehearth are isolated by a suitable overhead skimmer block. The atmosphere of the melter is subjected to combustion conditions in which an excess of oxygen is utilized to provide the positive oxidizing conditions. This maintains the base glass in an oxidized state and accordingly colorless.

In the forehearth, the reducing conditions are established as set forth above, to wit, by using insufficient oxygen for complete combustion of the fuel. Reducing gases such as hydrogen, carbon dioxide, methane and so forth can be used to further implement the reducing atmosphere if desired. This produces the chromophore.

This aspect of the invention further means that colorless ware can be made at one forehearth from the base glass and a broad range of amber colors can be produced from other forehearths. Advantages will be evident to those skilled in the art.

The iron and sulfur are present in this colorless glass in minor amounts and therefore will not appreciably affect the appearance, physical or colorless characteristics of the molten base glass so long as it is maintained in the oxidized state.

By this embodiment of the invention, exceptionally good amber characteristic glasses have been produced utilizing minor amounts of iron and sulfur in the base glass. Very often the amount of iron is present as an impurity in the sand.

I claim:

1. In a process of making a colored glass, the steps of melting, under reducing conditions, in the melting zone of a furnace having a forehearth, a base glass having a composition within the range

| Oxide: | Percent by weight |
|---|---|
| $SiO_2$ | 60–75 |
| $Al_2O_3$ | .3–10 |
| $CaO+MgO$ | 6–15 |
| $Na_2O$ | 12–18 |
| $K_2O$ | 0–5 |
| $BaO$ | 0–5 |
| Iron oxide (as $Fe_2O_3$) | .05–.10 |
| Sulfur (as S) | .05–.10 | flowing the molten base glass into the forehearth of the melting furnace,
adding to the molten base glass in the forehearth a colorant frit glass having a composition within the range

| Oxide: | Percent by weight |
|---|---|
| $SiO_2$ | 55–70 |
| $CaO$ | 5–10 |
| $Na_2O$ | 10–20 |
| Iron oxide (as $Fe_2O_3$) | 3–20 |
| Sulfur (as S) | .05–1 | the base glass and frit glass having the same type of colorant, and the iron oxide and sulfur of both the base glass and the frit glass being predominantly as ferrous iron and sulfide sulfur, respectively,
fusing the frit into the base glass and admixing the fused frit glass and the base glass to produce a uniformly colored composite glass containing between about .2 and 1.0% by weight of iron oxide and sulfur,
issuing the composite glass from the forehearth,
and forming an article from the composite glass.

2. In a process of making an amber glass, the steps of melting an amber glass under reducing conditions in the melting zone of a furnace having a forehearth, the amber glass containing a threshold amount of a chromophore of ferrous iron and sulfide sulfur,
flowing the molten amber glass from the melting zone into the forehearth,
adding to the molten amber glass in the forehearth a frit glass enriched with at least 3.05 percent by weight of a chromophore of at least 3.0% ferrous iron and at least .05% sulfide sulfur, in an amount sufficient to yield a composite amber glass having a composition within the range

| Oxide: | Percent by weight |
|---|---|
| $SiO_2$ | 60–75 |
| $Al_2O_3$ | .3–10 |
| $CaO+MgO$ | 6–15 |
| $Na_2O$ | 12–18 |
| $K_2O$ | 0–5 |
| $BaO$ | 0–5 |
| Iron oxide (as $Fe_2O_3$) plus sulfur (as S) | .2–1.0 | the base glass having the same type of colorant as the frit glass, and the iron oxide and sulfur of both the base glass and the frit glass being present predominantly as ferrous iron and sulfide sulfur, respectively,
fusing the frit glass into the base glass and admixing the fused frit and the base glass to produce a uniformly colored composite glass,
issuing the composite glass from the forehearth,
and forming an article from the composite glass.

3. In a process of making amber glass, the steps of melting an amber base glass under reducing conditions in the melting zone of a furnace having a forehearth, the amber glass having a composition within the range

| Oxide: | Percent by weight |
|---|---|
| $SiO_2$ | 60–75 |
| $Al_2O_3$ | .3–10 |
| $CaO+MgO$ | 6–15 |
| $Na_2O$ | 12–18 |
| $K_2O$ | 0–5 |
| $BaO$ | 0–5 |
| Iron oxide (as $Fe_2O_3$) | .05–.10 |
| Sulfur (as S) | .05–.10 | flowing the molten amber base glass from the melting zone into the forehearth, adding to the molten base glass in the forehearth a colorant glass containing reduced iron and sulfur and compatible with the base glass, and the colorant glass having the same type of color as the base glass, the amount of colorant glass added being sufficient to yield a composite glass having a combined iron oxide and sulfur content in the range between more than about .2 and up to about 1.0%, the iron oxide and sulfur being present predominantly as ferrous iron and sulfide sulfur, respectively, fusing the colorant glass into the base glass and admixing the fused colorant glass with the base glass to produce a uniformly colored composite glass.

4. A colorant enriched glass frit, consisting essentially of soda-lime-silicate glass-forming oxides, containing as chromophore-forming ingredients from about 3 to about 20% by weight of iron oxide and from about .05 to about 1% by weight of sulfur, and the frit glass having been prepared in the presence of sufficient reducing agent selected from the group of silicon, aluminum, zinc and sea coal to release the iron oxide predominantly as FeO and the sulfur as sulfide.

5. A colorant enriched frit glass for addition to a molten base glass to form an amber composite glass and having a composition within the range

| Oxide: | Percent by weight |
|---|---|
| $SiO_2$ | 55–70 |
| CaO | 5–10 |
| $Na_2O$ | 10–20 |
| Iron oxide (as $Fe_2O_3$) | 3–20 |
| Sulfur (as S) | .05–1 | and the iron oxide being present predominantly in the ferrous state and the sulfur being present predominantly in the sulfide state.

6. In a process of making amber glass, the steps of melting a batch of amber glass-forming ingredients under reducing conditions in the fuel-fired melting zone of a furnace having a forehearth, to produce a partially colored base amber glass, the melting zone producing melting of the glass by radiant heat, the batch consisting essentially of soda-lime-silica glass-forming oxides and containing not more than about .2% by weight combined, of iron oxide and sulfur, flowing the molten base amber glass into the forehearth of the furnace, adding to the molten base amber glass in the forehearth the same type of colorant as the base glass and the colorant comprising a major amount of iron and sulfur in reduced state and the colorant being compatible with the base glass, the amount of colorant added being sufficient to yield a composite glass having a colorant concentration of iron and sulfur in the range between more than about .2 and up to about 1.0% by weight, in the composite glass, the iron oxide being present predominantly as ferrous oxide and the sulfur being present predominantly as sulfide, fusing the colorant into the base glass in the forehearth, and uniformly admixing the fused colorant throughout the base glass to produce a uniformly colored composite glass.

7. In a process of making amber glass, the steps of melting a batch of glass-forming ingredients under reducing conditions in the fuel-fired melting zone of a furnace having a forehearth, to produce an amber base glass of low color intensity, the melting zone producing melting of the base glass by radiant heat, the batch including a relatively small amount of colorant ingredients so that heat transfer by radiation is maintained at a high level, flowing the molten base glass into the forehearth, adding to the molten amber base glass a colorant containing iron oxide in FeO form and sulfur in sulfide form the colorant being compatible with the base amber glass, the amount of colorant added being sufficient to yield a composite glass having a colorant concentration of a level that would substantially inhibit melting under the radiant heating conditions of the melter, fusing the colorant into the base glass in the forehearth and admixing the fused colorant and the base glass to produce a uniformly colored composite amber glass having a composition in the range

| Oxide: | Percent by weight |
|---|---|
| $SiO_2$ | 60 to 75 |
| $Al_2O_3$ | 0.3 to 10 |
| $CaO+MgO$ | 6 to 15 |
| $Na_2O$ | 12 to 18 |
| $K_2O$ | 0.0 to 5 |
| BaO | 0.0 to 5 |
| Iron oxide (as $Fe_2O_3$) | 0.05 to 0.30 |
| Sulfur (as S) | 0.05 to 0.70 |
| Iron oxide (as $Fe_2O_3$) plus sulfur (as S) | .2–1.0 | the iron oxide and sulfur being present predominantly as ferrous iron and sulfide sulfur.

8. In a process of making colored glass, the steps of melting under oxidizing conditions in a furnace having a forehearth, a batch of glass-forming ingredients including color-forming materials that are colorless under oxidizing conditions, but produce color when present in molten glass under reduced conditions, flowing the molten colorless base glass into the forehearth, maintaining the atmosphere of the forehearth under reducing gaseous conditions to convert the surface of the molten glass from an oxidized state to a reduced state and thereby convert said surface to a colored glass, adding a colorant to the molten glass in the forehearth, the colorant containing color-forming ingredients that are compatible with the base glass under the forehearth reducing conditions, fusing the colorant into the base glass and admixing the fused colorant and the base glass to produce a uniformly colored composite glass, issuing the composite glass from the forehearth, and forming an article from the composite glass to thereby yield an article having different color intensity from the base glass.

References Cited
UNITED STATES PATENTS
2,916,387 12/1959 Commons _____ 106—52
3,003,886 10/1961 Pither _____ 106—52

HELEN M. McCARTHY, *Primary Examiner.*